United States Patent
Lai

(10) Patent No.: US 10,409,803 B1
(45) Date of Patent: *Sep. 10, 2019

(54) DOMAIN NAME GENERATION AND SEARCHING USING UNIGRAM QUERIES

(71) Applicant: Go Daddy Operating Company, LLC, Scottsdale, AZ (US)

(72) Inventor: Wei-Cheng Lai, Cupertino, CA (US)

(73) Assignee: GO DADDY OPERATING COMPANY, LLC, Scottsdale, AZ (US)

(*) Notice: Subject to any disclaimer, the term of this patent is extended or adjusted under 35 U.S.C. 154(b) by 115 days.

This patent is subject to a terminal disclaimer.

(21) Appl. No.: 15/366,587

(22) Filed: Dec. 1, 2016

(51) Int. Cl.
*G06F 16/23* (2019.01)
*G06F 16/2457* (2019.01)
*G06F 16/903* (2019.01)

(52) U.S. Cl.
CPC .... *G06F 16/2365* (2019.01); *G06F 16/24578* (2019.01); *G06F 16/90335* (2019.01)

(58) Field of Classification Search
CPC ......... G06F 17/30371; G06F 17/30979; G06F 17/30067; G06F 17/30008; G06F 17/30887; G06F 17/30893; G06F 8/20; G06F 16/2365; G06F 16/90335; G06F 16/24578
See application file for complete search history.

(56) References Cited

U.S. PATENT DOCUMENTS

| 7,236,923 | B1 | 6/2007 | Gupta | |
| 9,990,432 | B1* | 6/2018 | Lai | H04L 29/12641 |
| | | | | 707/803 |
| 2009/0210419 | A1 | 8/2009 | Chitnis et al. | |
| 2009/0282038 | A1 | 11/2009 | Subotin et al. | |
| 2011/0258237 | A1* | 10/2011 | Thomas | G06F 17/30887 |
| | | | | 707/803 |
| 2012/0084076 | A1 | 4/2012 | Boguraev et al. | |
| 2013/0144592 | A1 | 6/2013 | Och et al. | |
| 2015/0039599 | A1* | 2/2015 | Carroll | G06F 17/30876 |
| | | | | 707/724 |
| 2015/0154294 | A1* | 6/2015 | Kamdar | G06Q 30/02 |
| | | | | 707/709 |

OTHER PUBLICATIONS

Metaphone, https://en.wikipedia.org/wiki/Metaphone, Admitted Prior Art.

* cited by examiner

*Primary Examiner* — Ashish Thomas
*Assistant Examiner* — Suman Rajaputra
(74) *Attorney, Agent, or Firm* — Quarles and Brady LLP

(57) ABSTRACT

Systems and methods of the present invention provide for one or more server computers communicatively coupled to a network and configured to: receive a string used to search an available domain name, identify a token within the string including a unigram, and generate and transmit one or more available domain name candidates including a unigram and one or more tokens interchangeable with a token previously co-occurring with the unigram token.

18 Claims, 13 Drawing Sheets

File Edit Tools

Domain Name Registration Control Panel

Domain Name Search: | loanstar | | .com ▽ | | Submit |

Sorry, loanstar.com is not available for registration. Please select one of the available alternative candidate domain names below:

loanstar.net - register
loanstararizona.com - register
myloanstar.com - register
loanstarbusiness.com - register
loanstar.co - register You may also try another search:

Domain Name Search: | loan-star | | .com ▽ | | Submit |

FIG. 3

DOMAIN NAME GENERATION AND SEARCHING USING UNIGRAM QUERIES

FIELD OF THE INVENTION

The present invention generally relates to the field of domain names and specifically to the field of identifying misspelled tokens and acronyms and recommending domain names according to corrected misspellings, related acronyms or full forms of the acronyms, and alternative domain names for unigram-based domain name queries.

SUMMARY OF THE INVENTION

The present inventions provide methods and systems comprising one or more server computers communicatively coupled to a network and including one or more processors executing instructions in a memory coupled to the server computer, the instructions causing the server computer to receive a string used to search an available domain name, identify a token within the string, select a misspelled token in a misspelled token database matching the token, and generate a corrected search string with a corrected token replacing the misspelled token. If the corrected search string has a higher probability of representing the intent of the user, the server generates and transmits one or more available domain name candidates with the corrected token to the user's client computer.

In other embodiments, the instructions cause the server computer to receive a string used to search an available domain name, identify a token within the string, and select an acronym or full string token in an acronym database matching the token. If the token matches acronym or full string tokens in the acronym database, the server generates and transmits one or more available domain name candidates with the acronym or full string tokens to the user's client computer.

In other embodiments, the instructions cause the server computer to receive a string used to search an available domain name, identify a token within the string including a unigram, and generate and transmit one or more available domain name candidates including a unigram and one or more tokens interchangeable with a token previously co-occurring with the unigram token.

The above features and advantages of the present invention will be better understood from the following detailed description taken in conjunction with the accompanying drawings.

BRIEF DESCRIPTION OF THE DRAWINGS

FIG. 3 is an example user interface for searching a domain name and receiving alternative domain name candidates.

DETAILED DESCRIPTION

Figure 1:
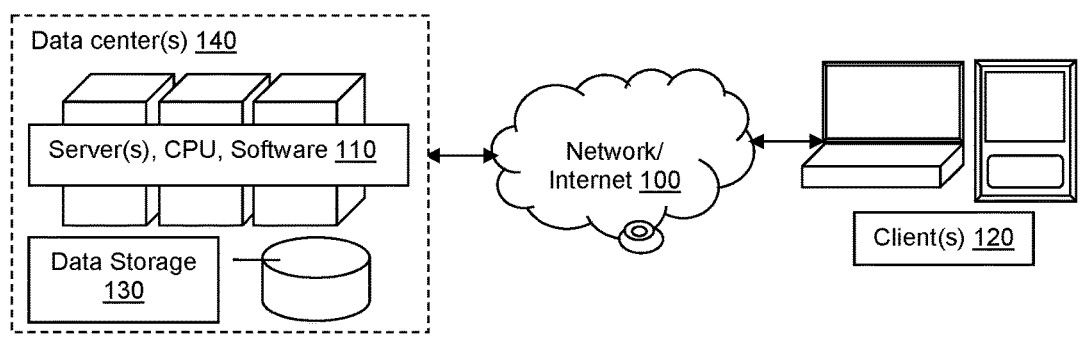
FIG. 1 illustrates a possible system for identifying misspells and acronyms, and recommending alternative domain name candidates.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

The Internet is a worldwide network of computers and computer networks arranged to allow the easy and robust exchange of information between computer users on clients. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Websites may consist of a single webpage, but typically consist of multiple interconnected and related web pages. Menus, links, tabs, etc. may be used to move between different web pages within the website or to move to a different website.

Websites may be created using HyperText Markup Language (HTML) to generate a standard set of tags that define how the web pages for the website are to be displayed. Users of the Internet may access content providers' websites using software known as an Internet browser, such as GOOGLE CHROME, MOZILLA FIREFOX, or MICROSOFT EDGE. After the browser has located the desired webpage, it requests and receives information from the webpage, typically in the form of an HTML document, and then displays the webpage content for the user on the client. The user then may view other webpages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites 104 because each website 104, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website 104 on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the Registry 107 is also the authoritative source for contact information related to the domain name and is referred to as a "thick" Registry. For other TLDs (e.g., .com and .net) only the domain name, registrar identification, and name server information is stored within the Registry, and a Registrar is the authoritative source for the contact information related to the domain name. Such Registries are referred to as "thin" registries. Most gTLDs are organized through a central domain name Shared Registration System (SRS) based on their TLD. TLDs may also be referred to as domain name extensions.

The process for registering a domain name with .com, .net, .org, and some other TLDs allows an Internet user to use an ICANN-accredited Registrar to register their domain name. For example, if an Internet user, John Doe, wishes to register the domain name "mycompany.com," John Doe may initially determine whether the desired domain name is available by contacting a domain name registrar. The Internet user may make this contact using the Registrar's webpage and typing the desired domain name into a field on the registrar's webpage created for this purpose. Upon receiving the request from the Internet user, the Registrar may ascertain whether "mycompany.com" has already been registered by checking the SRS database associated with the TLD of the domain name or by checking with the Registry. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

A current problem many Internet users face is trying to find a domain name that is available. It is generally desirable to have a domain name that is as generic and short as possible. A generic domain name makes a website easier to find, thereby increasing its traffic, while shorter domain names are easier to remember and enter into a browser. Unfortunately, many people want the same short generic domain names making it difficult for new Internet users to find a good domain name that is not already registered. The present invention addresses the problem of finding a good available domain name.

Many current-available solutions to finding the ideal available domain name rely on static language dictionaries including information such as part-of-speech and synonyms. Issues associated with this static approach include, for example, a limited number of synonyms, static vocabulary dictionaries which do not rank the popularity of synonyms when considering name ranking, and no consideration of domain name transformation types.

As more and more organizations expand internationally, registrars are offering domain names incorporating more and more additional languages. These registrars require a scalable and efficient way to utilize multilingual domain name search engines to include these additional languages.

The disclosed embodiments provide many advantages over currently-existing systems and methods by: recognizing misspelled tokens within a user's domain name search query and recommending alternative available domain names based on a corrected spelling; identifying one or more acronyms or full forms of an acronym within a user's domain name search query and recommending alternative available domain names based on the complimentary acronym or full form of the acronym; and identifying a popular unigram-based domain name or derivative unigram-based domain name within a user's domain name search query and recommending alternative available domain names including substituted interchangeable tokens for tokens typically appended to the popular derivative unigram-based domain names.

Figure 2:
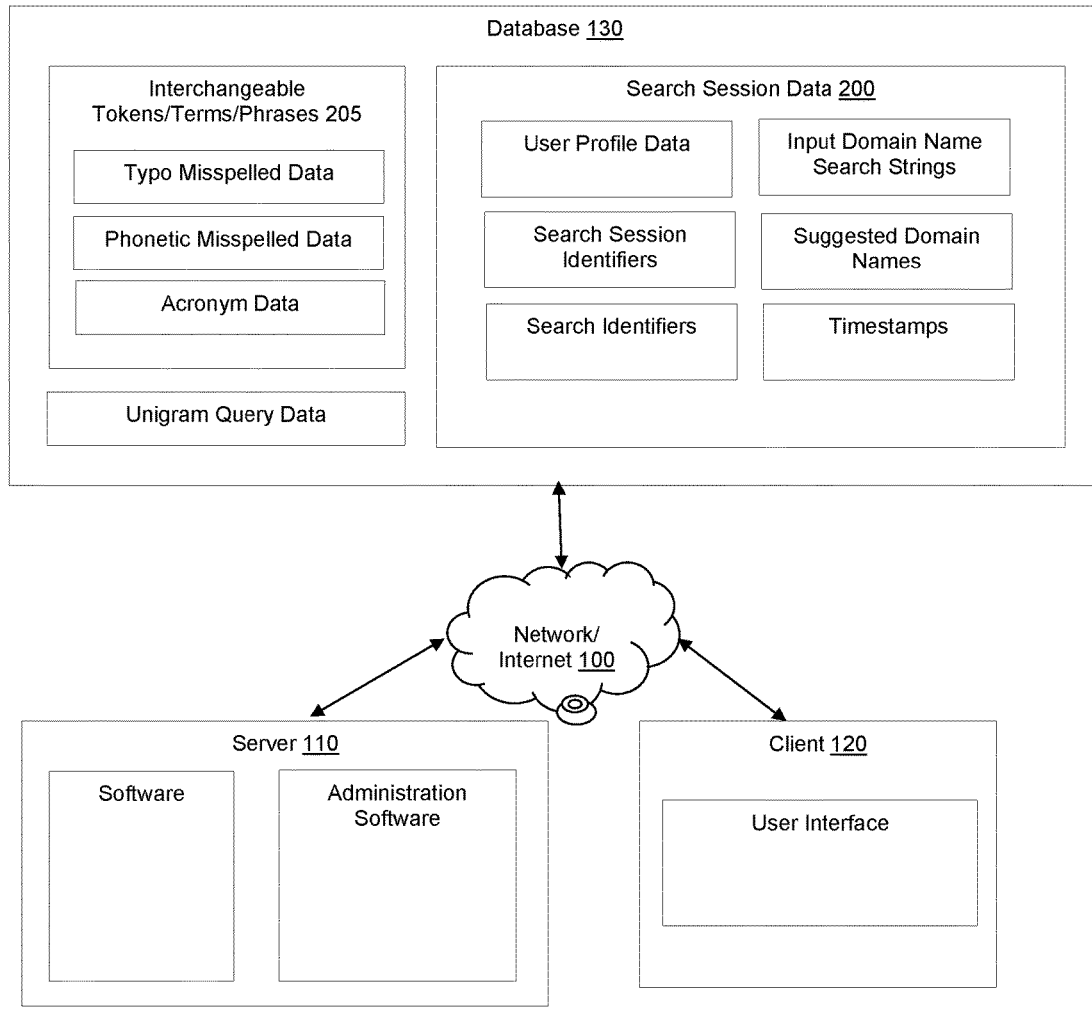
FIG. 2 illustrates a more detailed possible system for identifying misspells and acronyms, and recommending alternative domain name candidates.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 200, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Generally, the disclosed inventions may identify interchangeable tokens used to generate alternative domain name candidates. In some embodiments, the interchangeable tokens may be identified by analyzing a series of search strings within a session of domain name searches performed by one or more users. The search session may begin as a user navigates to a web page administered by a domain name registrar (e.g., GoDaddy), and logs into a user account for the registrar, possibly using a username and password. After being authenticated to the website, the user may navigate to a web page for searching a desired and available domain name, as seen in the non-limiting example embodiment in FIG. 3. The user may then search a desired available domain name (e.g., loanstar.com). The server may receive the data input by the user and search domain name zone files associated with the appropriate registry (e.g., .com) in order to determine if the requested domain names is available. If not, algorithms in the instructions executed by server 110 may 'spin' the domain name to identify alternative domain name candidates similar to the user's original search (e.g., loanstar.net, loanstararizona.com, etc.).

As demonstrated in FIG. 3, if the user does not select one of the spun domain names, the user may submit additional searches, modifying the input string for the original desired domain name. For example, if the input string for the user's original desired domain name was loanstar, the user may: add a dash to hyphenate the original search (e.g., loanstar-→loan-star), prepended characters or tokens and dropped characters or tokens (e.g., loan-star→theloan), drop characters or tokens and appended characters, tokens and/or numbers (e.g., theloan→loanguru; theloan→loan247), and replace characters or tokens (e.g., loanguru→loanninja; loan247→loaner).

In the disclosed embodiments, appending or dropping tokens may include an acronym (or an acronym with a full acronym expansion), and replacing characters may include misspelling one or more tokens in the searched domain name, or replacing one or more tokens in a unigram query or any of its derivatives. The misspelled domain name may be a typo by the user, or the user may misspell the domain name on purpose, searching for phonetically similar domain names.

Server 110 may continue searching the zone file to determine whether the user's selected domain names and variations on those domain names are available, and if not, the user may continue searching domain names until the user either: succeeds in finding one or more desired available domain names and registers the domain names; navigates away from the domain name search and/or registration web page; and/or closes their browser. The actions taken by the user between the user accessing the registrar search functionality and the user terminating the search is referred to a domain name search session in this disclosure.

Server 110 may log the user input and additional data from the search session, and store the associated data 200 in database 130 in association with a unique identifier for the domain name search session. The data 200 stored in data storage 130 may include, as non-limiting examples: the user's access to the domain name search software; a unique identifier for each search; each search string input by the user and received by server 110; the resulting suggested domain names; a time stamp for each of the previous transactions; and the unique identifier for the search session.

After the user completes the search session, server 110 may analyze all received data 200 during the search. Server 110 may identify each user input from the search, possibly storing it as its own data record in data storage 130 with a unique identifier. In some embodiments, each search may have a timestamp, and each unique identifier may be sequential to reflect earlier and later time stamps.

Server 110 may query the domain name search logs 200 within database 130 and identify consecutive searches during a specific search session. Server 110 may identify interchangeable terms 205 by either mining interchangeable terms 205 from search session queries, or applying a neural network algorithm (e.g., Word2Vec), described below. Server 110 may use the results of the mined interchangeable terms from search session queries 205, and/or the results of the algorithm, to perform misspell, acronym, and/or popular co-occurring term extraction for storage in one or more misspell or acronym databases, as described below.

Server 110 may execute a database query identifying each unique identifier for each search session 200. Server 110 may analyze each collection of data records 200 that include or are associated in database 130 with the unique identifier, and further tokenize the search string within the appropriate data field for each data record. This tokenization may occur in multiple steps. For example, as a preliminary step, server 110 may identify the longest common string shared between any of the data records associated in database 130 with the search session 200 identifier. In some embodiments, server 110 may execute the comparison between sequential unique identifiers for each search, or between sequential time stamp data fields. Server 110 may align the longest common string to identify interchangeable terms 205 between consecutive search strings, as described below.

Using the search session 200 in FIG. 3 as a non-limiting example, server 110 may execute a search query and identify two data records sharing a common session 200 identifier data field. Server 110 may analyze the search string data field in each data record to determine that a first search string data field included the searched string "loanstar," and the second data record included the searched string "theloanshack." Server 110 may therefore make determinations about the search modification according to the common aligned string "loan."

Server 110 may then tokenize (i.e., identify keyword tokens within) the longest common string, as well as any additional strings, in each of the search log data records associated with the search session 200. Continuing the example above, server 110 may identify the tokens "loan" and "star" in the search string data field in the first data record, and the tokens "the," "loan," and "shack" in the search string data field of the second data record. In some embodiments, server 110 may identify the tokens by identifying potential matches within a keyword dictionary database, and applying a language model to determine the most likely combination of tokens, as described below.

The keyword dictionary database may include a data list of known words, which server 110 may compare against each potential token in each search string data field in each search session data record 200. Once candidate tokens have been identified, server 110 may apply a language model to estimate the probability of a series of tokens.

As a non-limiting example, a search string within a search session may be "superbowl." Server 110 may identify two potential bigrams made up of keyword tokens in the keyword dictionary database, including "super bowl" and "superb owl." As a non-limiting example, server 110 may calculate an estimation of the probability of a series of tokens by applying the formula: Probability (super bowl) =|super bowl|/(total number of bigrams). As a non-limiting example, the results of this calculation estimating the probability may determine that super bowl has a 356:1 probability of being the intended series of tokens, rather than superb owl. Server 110 may therefore determine that the tokens in the search string "superbowl" consist of "super" and "bowl."

Using the tokenized search string, server 110 may identify interchangeable terms 205 between each consecutive/sequential search string, and/or any other search string within the search session, by comparing each set of tokens within a first data record associated with the search session 200 with each set of tokens from any additional associated search record. Continuing the example above, if a user searched "loanstar" and "theloanshack" during a search session (possibly sequentially), server 110 may compare the data records and align the co-occurring token "loan."

By aligning its analysis around the string/token "loan," server 110 may determine that "loanstar" has no preceding "the" and therefore the token "the" was prepended to the token "loan." Likewise, where "star" followed "loan" in the first search string, server 110 may determine, from the comparison analysis, that "shack" has replaced "star" in the second search string.

Server 110 may perform similar analyses to determine that the user has added a dash or hyphenated the original search string (e.g., loanstar→loan-star), prepended characters or tokens and dropped characters or tokens (e.g., loanstar→theloan), dropped characters or tokens and appended characters, tokens and/or numbers (e.g., theloan→loanguru; theloan→loan247), and replaced characters or tokens (e.g., loanguru→loanninja; loan247→loaner).

In addition to identifying interchangeable terms 205 through analysis of search session data, server 110 may also identify interchangeable terms 205 by applying a neural network algorithm (e.g., Word2Vec). This algorithm is a data driven model, and therefore may receive content data in the form of one or more documents received from data extraction from a web crawl, or may select domain name search session data 200 as described in more detail herein. In other words, the algorithm identifies synonyms, interchangeable tokens, terms, phrases, and/or equivalent concepts 205 from a large corpus, and inserts the identified data into a methodology. For example, given the token "pizza," the algorithm may identify equivalent tokens, terms, phrases, or concepts (e.g., pizzeria, food, burger, Italian, etc.)

The algorithm may identify a target token, term, phrase or concept within the content, as well as any number of tokens, terms, phrases, or concepts preceding or following the target word. These surrounding tokens, terms, phrases, or concepts make up the context of target word in the neural network algorithm.

The context of the surrounding words may be used to train a two-layer neural network to map a word to high dimensional space (e.g., word→100 dim vector). In other words, the algorithm may identify a high volume of interchangeable terms or concepts that have appeared in a similar context, meaning the interchangeable term or concept has appeared surrounded by the same or equivalent terms or concepts as the target word. These interchangeable terms and concepts 205 may be categorized accordingly. Continuing the example above, server 110 may categorize pizza, pizzeria, food, burger, Italian within the category food, and store them in association with this concept in database 130.

In some embodiments, the algorithm may apply a skip-gram model to identify tokens, terms, phrases, or concepts that appear in a similar context, and the distance between two word vectors may measure the similarity between the two words. Thus, the neural network algorithm may identify similar or interchangeable words 205 for a selected target word.

The neural network within the algorithm may receive, as input, a token within a document or text string, with the intent of training the neural network to predict an interchangeable word or concept 205. The output of the neural network may comprise the context of the document or text string, meaning the tokens or concepts surrounding the target token, which the neural network also tries to predict. The algorithm may therefore map the token, based on its context to a vector representing the word. This vector may be set so that one or more dimensions may be represented and placed into condensed vector space. In some embodiments, this vector may be set to 100 dimensions. These dimensions may represent the vector to calculate the Euclidean distance between any two words, which may further be used to measure the similarity between any two words.

For example, the web or search session documents may include the content "the cat sat at the table," and "the cat ate at the table." In this example, server 110 may apply the neural network to identify "sat" as the keyword, and "ate" as an interchangeable term 205 because the two terms appear in the same context, and possibly share common attributes identifying them both within the category "verb" within database 130. Using the vector set within the neural network, additional examples of interchangeable words may be identified from context. For example, server 110 may identify interchangeable words 205 such as king and queen (king<->queen), bike and bicycle (bike<->bicycle), and house and home (house<->home).

This algorithm may also be applied to documents containing more than one language. For example, server 110 may apply this algorithm to documents containing both English and Spanish, so that server 110 may identify and apply both English and Spanish concepts, language dictionaries, misspellings, acronyms, unigram domain name suggestions, etc. according to embodiments disclosed herein.

In some embodiments, server 110 may apply the neural network algorithm to the data stored in database 130 in association with search sessions 200, as described above, rather than to data extraction performed during a web crawl. Server 110 may execute a database query identifying all data associated with each unique search session 200 identifier. This data 200 may be much more focused than data extracted during a web crawl, because the data 200 is focused on a specific event. Therefore, rather than analyzing data from documents extracted during a web crawl, which may be extensive and produce less focused data, server 110 may select all search data 200 associated with a unique search session 200 identifier in database 130, aggregate the data 200 as into a single document, tokenize the document, and input this document as an input feed for the neural network algorithm.

By using this approach, server 110 may execute calculations according to the most relevant data, thereby improving the quality of the analysis. Analysis of sequential domain name searches 200 provides a clear identification of which tokens and characters were replaced, and thus a clearer analysis of the user's intent. By contrast, the analysis based on web-crawled documents tends to be extensive because of the sheer volume of data, and therefore affects the quality of the analysis.

The search session 200 analysis and/or neural network algorithm may therefore identify tokens, terms, phrases, and/or concepts which may be substituted for one another and recommended while a user is selecting alternative domain name candidates during a domain name search. These tokens, terms, phrases, and/or concepts may not necessarily be synonyms, but may be associated in database 130 within the same concept category. Server 110 may store each of these interchangeable concepts 205 in association in database 130, as well as the frequency with which they occurred in a search session 200 or neural network analysis (i.e., for each word pair that already exists in the database, the frequency may be incremented). The following example demonstrates a non-limiting example of a possible database table:

| Interchangeable Terms | | | |
|---|---|---|---|
| Id | original | modification | frequency |
| 1 | apartments | apts | 8867 |
| 2 | virtual reality | vr | 13479 |
| 3 | trqvel | travel | 52 |
| 4 | life | lyfe | 5597 |
| 5 | bicycle | bike | 5981 |
| 6 | basketball | sport | 6537 |
| 7 | 247 | 365 | 32340 |
| 8 | today | now | 105026 |
| 9 | basketball | football | 2539 |
| 10 | animal | cat | 661 |
| ... | ... | ... | ... |

Server 110 may then analyze the interchangeable terms 205 to determine the type of interchangeable term 205, and update the data in database 130 for each interchangeable term pairing 205 to reflect the interchangeable term 205 type. As non-limiting examples, server 110 may identify the interchangeable terms 205 as a synonyms, hypernyms, hyponyms, folksonomies, comparable terms, abbreviations, misspelled term (possibly divided into typos and phonetic spins, discussed below), acronyms, and so forth.

Server 110 may identify each interchangeable term 205 type by selecting all word pairs in database 130 pairing interchangeable terms 205, and generating a logical loop to analyze each pairing to determine its type. In some embodiments, these types may be determined by comparing each word in the word pair with a keyword dictionary, thesaurus, abbreviation dictionary, figure of speech dictionary, concept dictionary, language model, misspell dictionary, acronym dictionary, etc. as described below.

As non-limiting examples, server 110 may access and execute a query of an abbreviation dictionary database (i.e., a database associating common abbreviations with the full word for the abbreviation), and identify apts as an abbreviation for apartments in the example data table above. Server 110 may then update data record 1 to include a type data field of abbreviation for the stored word pair, as seen below:

| id | original | modification | frequency | type |
|---|---|---|---|---|
| 1 | apartments | apts | 8867 | abbreviation |

In another example, server 110 may access and execute a query of a synonym dictionary (i.e., a database associating words with common meanings), and identify bike as a synonym for bicycle in the example data table above. Server 110 may then update data record 5 to include a type data field of synonym for the stored word pair, as seen below:

| id | original | modification | frequency | type |
|---|---|---|---|---|
| 5 | bicycle | bike | 5981 | synonym |

In another example, server 110 may access and execute a query of a folksonomy or figure of speech dictionary (i.e., a database associating common figures of speech), and identify today and now, as well as 247 and 365 as interchangeable figures of speech in the example data table above. Server 110 may then update data records 7 and 8 to include a type data field of folksonomy for the stored word pair, as seen below:

| id | original | modification | frequency | type |
|---|---|---|---|---|
| 7 | 247 | 365 | 32340 | folksonomy |
| 8 | Today | now | 105026 | folksonomy |

In another example, server 110 may access and execute a query of a concept dictionary (i.e., a database associating concepts and their relationship to one another), and identify basketball as a hypernym of sport (basketball is a type of sport), animal as a hyponym of cat (animal is the generalized concept for cat), and basketball and football as comparable (basketball and football are both types of sports). Server 110 may then update data record 6 to include a type data field of hypernym for the stored word pair, 9 to include a type data field of comparable for the stored word pair, and 10 to include a type data field of hyponym for the stored word pair, as seen below:

| id | original | modification | frequency | type |
|---|---|---|---|---|
| 6 | basketball | sport | 6537 | hypernym |
| 9 | basketball | football | 2539 | comparable |
| 10 | animal | cat | 661 | hyponym |

In the more detailed examples below, server 110 identifies misspellings and acronyms within the word pairs in the data records. Server 110 updates the data record 6 to include a type data field of misspell (including typo or phonetic spin, explained in more detail below) or acronym for the stored word pair.

Figure 4:
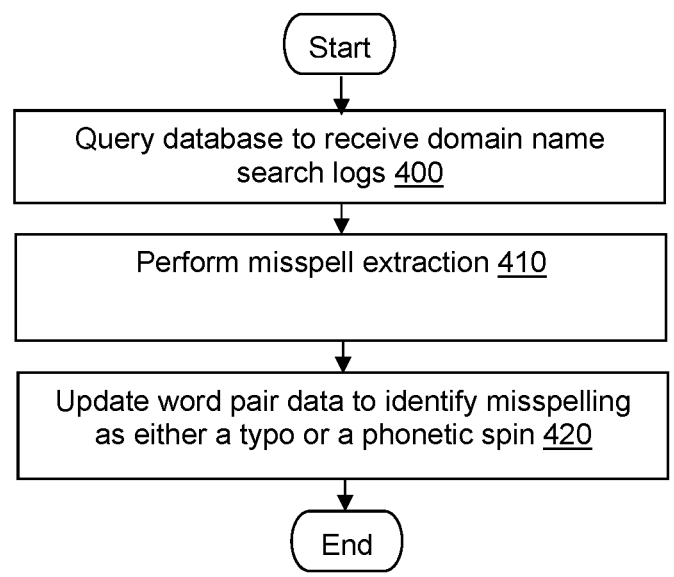
FIG. 4 is a flow diagram illustrating a possible embodiment of a method for identifying misspelled tokens in a domain name search.

FIG. 4 is a flowchart representing the method/process steps for identifying misspelled tokens within the data records for the word pairs. Server 110 may query database 130 to receive the name search logs 200 (Step 400). As noted above, these domain name search logs 200 may include interchangeable search tokens/terms 205 identified from any combination of stored consecutive search session queries 200, and a neural network algorithm such as Word2Vec applied to the search session and/or an Internet crawl. Server 110 may then perform a misspell extraction (Step 410), as shown in greater detail in FIG. 5 below. Server may then update the data associated in database 130 with the word pair data to reflect that the identified misspell is either a typo or a phonetic spin (Step 420).

Turning now to step 410 of FIG. 4, in order to determine that a word pair type is misspelled, server 110 may search any or each of the dictionaries described above, possibly via data query to each of the databases containing the dictionaries, for each token in the word pairs of each interchangeable term 205 data record. If server 110 determines from the search result that either of the tokens match one or more tokens in a misspell dictionary (either the typo dictionary or phonetic spin dictionaries described below), server 110 may flag the word pair type as a misspelling, and conduct further analysis to categorize the misspell as a typo or a phonetic spin type, described in more detail below.

Using the example of the word pair trqvel and travel in the data table above, server 110 may execute a database query searching all dictionary databases for the terms travel and trqvel. Server 110 may determine from the database query results that travel is found in a keyword dictionary database, for example. If trqvel is found in a misspell dictionary database (likely a typo dictionary according to the analysis below), server 110 may update the data record to identify the word pair type as typo, as seen below:

| id | original | modification | frequency | type |
|----|----------|--------------|-----------|------|
| 3  | Trqvel   | travel       | 52        | typo |
| 11 | kids     | kidz         | 100       | phonetic spin |

If server 110 determines from the search result that at least one of the tokens is not found in any of the dictionary databases, server 110 may flag the word pair type as misspelled, and analyze the misspelled token within the interchangeable terms 205 to determine the type of misspelling. Two non-limiting example types of analysis algorithms may include character analysis and phonetic similarity. Thus, the word pair may either be classified as a first type of misspell, referred to herein as a typo misspell, or a second type of misspell, referred to herein as a phonetic spin misspell, as seen in the table above.

Figure 5:
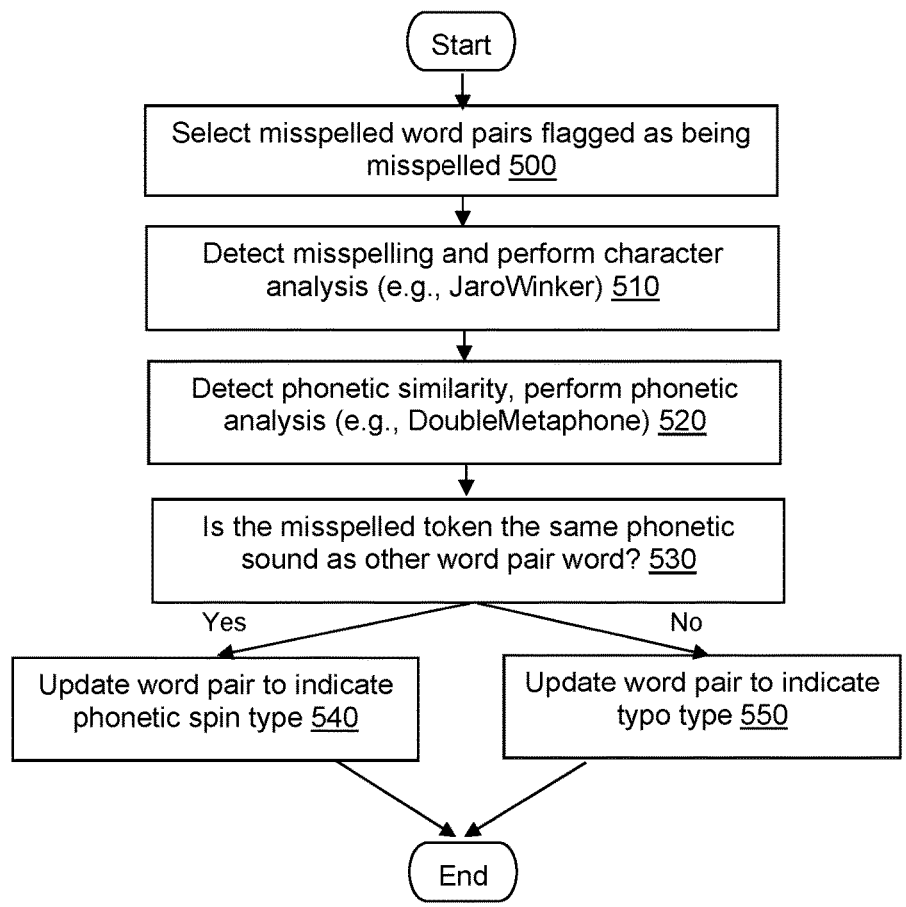
FIG. 5 is a flow diagram illustrating a possible embodiment of a method for searching a domain name and receiving alternative domain name candidates.

FIG. 5 is a flowchart representing a more detailed view of the misspell extraction in step 410 of the data flow in FIG. 4. Server 110 may select each of the interchangeable terms 205 from database 130 flagged as being misspelled as described above (Step 500). For each word pair, server 110 may detect the misspelling by performing character analysis, such as the JaroWinker metric described in detail below (Step 510), or identifying phonetic similarity by applying, for example, DoubleMetaphone and/or Soundex encoding algorithms to the word pair (Step 520). Server 110 may determine from the phonetic similarity analysis in Step 520 whether the misspelled token is the same phonetic sound (e.g., word pair includes "photo" and "foto") as the other token in the word pair (Step 530). If server 110 determines through this analysis that the misspelled token is the same sound, server 110 may update the word pair data record 205 to indicate that the word pair is a misspelling of type phonetic spin. If not already in the phonetic spin dictionary, server 110 may also insert the analysis data into a phonetic spin dictionary database (Step 540). If server 110 determines through its analysis that the misspelled token is not the same sound, server 110 may update the word pair data record 205 to indicate that the word pair is of type typo (Step 550). If not already in the typo dictionary, server 110 may also update the misspell dictionary to reflect the analysis.

Turning now to step 510 of FIG. 5, server 110 may detect the misspelling, in order to classify the word pair, by performing character analysis, including analysis of replaced characters or tokens. To accomplish this, server 110 may measure the edit distance between the tokens in the word pair. This edit distance may be the minimum number of edits needed in order to change the first token in a word pair to the second token in the word pair. This edit distance may define the number of switch operations needed in order to change from a misspelled token to a corrected version, or vice versa (i.e., to correct the misspelling from the misspelled token to the corrected token). Given the number of edits, server 110 may change the misspelled token to the corrected token.

Server 110 may utilize an edit model including identification of deletion, insertion, substitution, and/or transportation of one or more characters within the keyword token. In other words, server 110 may utilize operations to measure the edit distance, such as adding a character, dropping a character, adding and dropping characters, inserting characters, or swapping two characters.

Server 110 may utilize one or more metrics within this edit model, including, as non-limiting examples, Levenshtein Distance, Weighted Levenshtein Distance, Damerau Levenshtein Distance, and/or JaroWinker metrics. The Levenshtein Distance metric may identify the minimum number of single-character edits (e.g., deletions, insertions, substitutions) between two strings. For example, only one character edit is required between travel and trqvel. The Weighted Levenshtein Distance metric is a variation on the Levenshtein Distance metric, which weights the edits by the distance of two characters on a QWERTY keyboard. For example, the distance weight may be affected by the fact that A and Q are next to each other on the keyword, thus, trqvel is likely a typo type of misspell. The Damerau Levenshtein Distance metric is similar to the Levenshtein Distance metric, but identifies the minimum number of single-character edits and transportation of two adjacent characters. The JaroWinker metric is a variation on the Damerau Levenshtein Distance metric, wherein value lies in [0.0, 1.0], and transportations between two close characters are given higher weights.

Returning to Steps 520 and 530 in FIG. 5, for each of the interchangeable terms 205, server 110 may detect the misspelling by identifying phonetic similarity between the tokens in the word pair. Server 110 may apply, for example, DoubleMataphone and/or Soundex encoding to the word pair (Step 520). Server 110 may determine from the phonetic similarity analysis whether the misspelled token is the same sound as the other interchangeable token (Step 530).

Server 110 may utilize one or more metrics in determining pronunciation-based misspellings. As a non-limiting example, the server may identify phonetic similarity by mapping strings, and/or the tokens identified within the strings, to DoubleMetaphone encodings using DoubleMetaphone soundex. As non-limiting examples, a user may input coffe or lyft as tokens within search strings. Server 110 may identify phonetic similarity using DoubleMetaphone encodings, mapping "coffe" to "coffee," which are phonetically equivalent using the DoubleMetaphone phonetic stub KF. Likewise, server 110 may identify phonetic similarity between "lyft" and "lift," which are phonetically equivalent using the DoubleMetaphone phonetic stub LFT. These equivalents may therefore be identified as phonetic spin misspellings. However, a comparison between "food" and "fool" may not be identified as phonetic spin misspellings, because server 110 may identify no phonetic similarity between food and fool, which are not phonetically equivalent using the DoubleMetaphone phonetic stubs FT and FL. Instead, this word pair would be identified as a type misspelling type.

Figure 6:
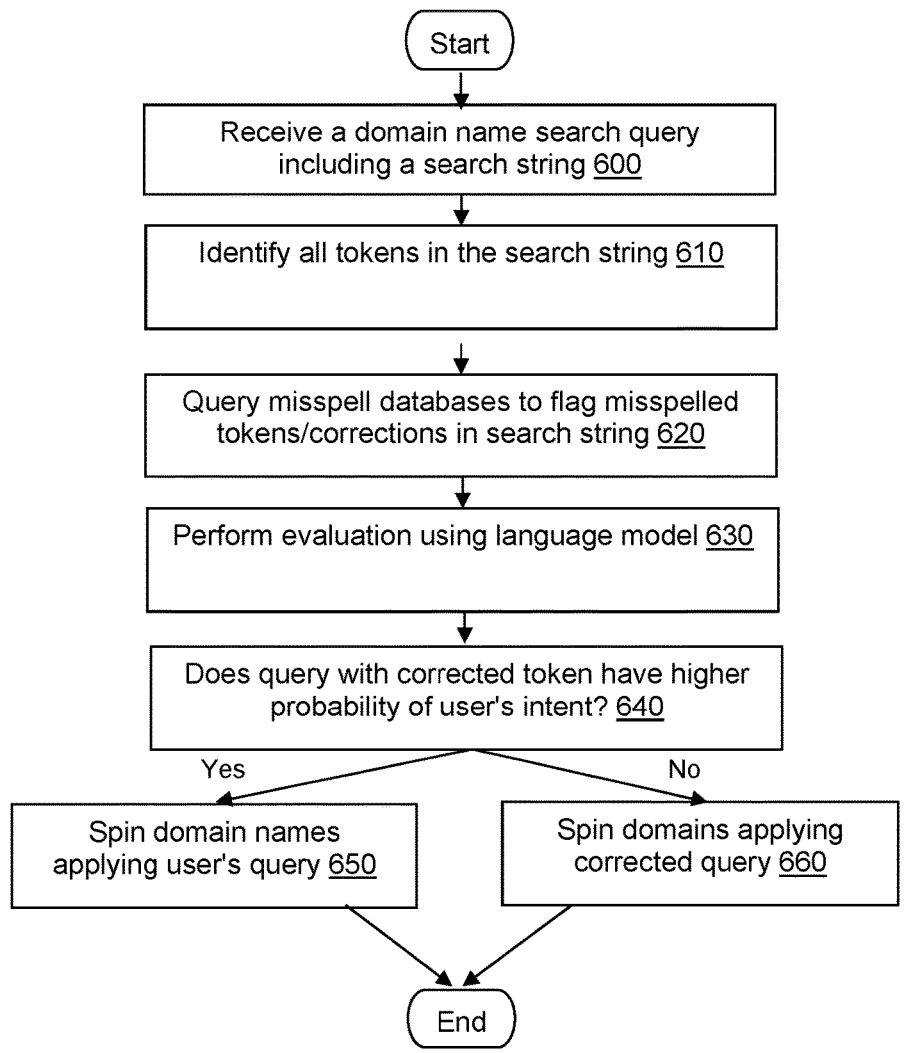
FIG. 6 is an example user interface for searching a domain name and receiving alternative domain name candidates.
Figure 7:
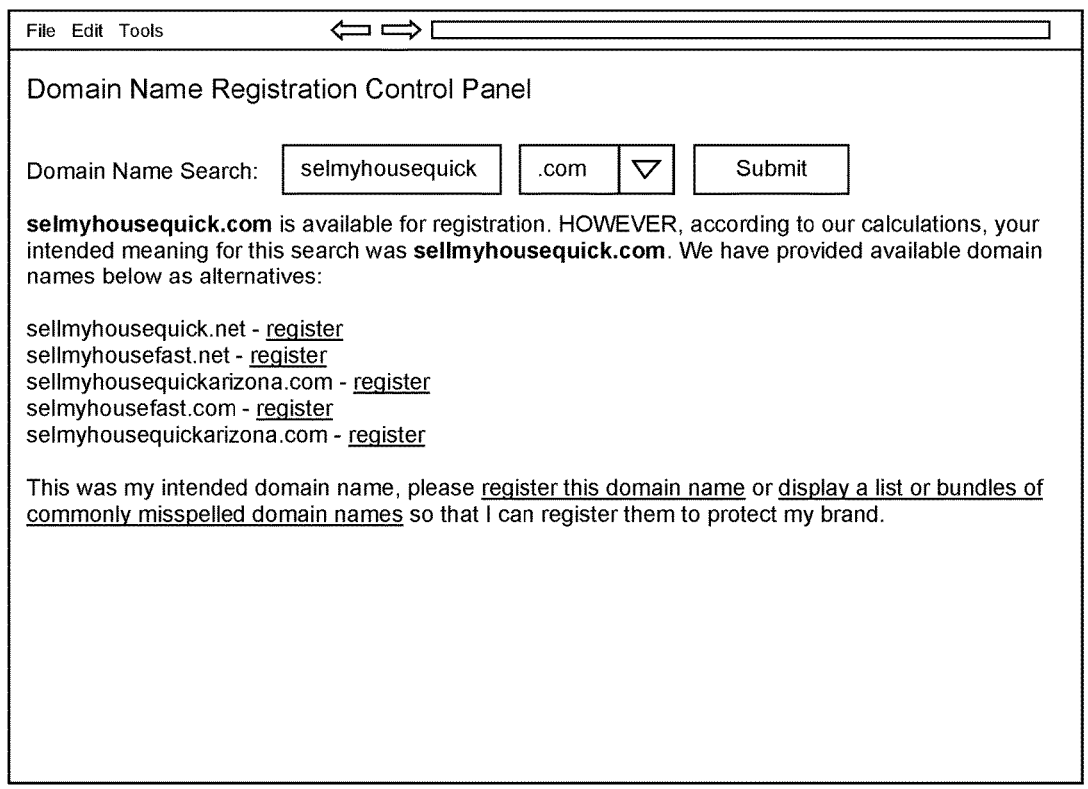
FIG. 7 is a flow diagram illustrating a possible embodiment of a method for identifying acronyms in a domain name search.

FIG. 6 is a flowchart representing the method/process steps performed by server 110 in misspell correction, and FIG. 7 is a non-limiting example of a UI displayed to the user during or after completing the method steps in FIG. 6. Server 110 may receive a domain name search request/query, including a search string, from the user via a UI on client 120, such as that seen in FIGS. 3 and 7 (Step 600). Server 110 may then tokenize the search string to identify all tokens in the search string (Step 610). Server 110 may then query the misspell dictionar(ies) to flag any previously identified misspelled tokens that may exist in the search string and potential corrections for the misspelled tokens (Step 620). In other words, by querying the misspell dictionar(ies), the tokenization algorithm executed by the server becomes misspell aware, and is able to suggest misspell corrections (Step 620).

Sever 110 may perform an evaluation using the language model, as described in more detail herein (Step 630), and determine whether the query with the corrected token has a higher probability of reflecting the user's intended meaning according to the tokens within the search string (Step 640). If server 110 determines that the query with the corrected token does not have a higher probability of reflecting the user's intended tokens within the search string (Step 640), server may continue to execute domain name spin algorithms applying the user's original query (Step 650). However, if server 110 determines that the query with the corrected token does have a higher probability of reflecting the user's intended tokens within the search string (Step 640), server may suggest a correction of the token within the original search string and generate spins based on the corrected tokens (Step 660).

Turning now to step 630 of FIG. 6, server 110 may utilize the language model disclosed herein to determine if the search string in the domain name query includes misspelled tokens and should be corrected.

Server 110 may perform a linguistic analysis to determine a tokenized search sting that has the higher score from a linguistic point of view. In other words, the server may identify the more popular usage of the tokens within the search sting, possibly by executing a query of a database 130 storing a frequency of the tokens and the frequency of their usage together. Server 110 may then score the combination of tokens with the highest frequency higher than that of the combination of tokens with the lower frequency. Thus, even if one of the tokens in the query appears to be misspelled, if it has a higher frequency of usage, server 110 may determine that the higher scoring search string was the search string intended by the user.

Server 110 may therefore spin the alternative domain name candidates according to the higher scoring search string and tokenized tokens. In addition, in embodiments where the server determines that at least one token is misspelled, but has the higher score within the language model, server 110 may execute the domain name spin according to the misspelled tokens, but also include a link or other UI control, as seen in FIG. 7, indicating that additional domain names are available using the alternative search string, and that the user may access them using the UI control.

In some embodiments, alternative domain names may be generated for both the higher and lower scored search strings, according to the language model. Server 110 may either present the alternative domain names to the user as two separate lists, or may combine the lists, and rank the results with the domain names suggested from the higher scoring search string being weighted more than the lower scoring search string, and therefore ranked higher in the list.

As seen in FIG. 7, a user may input a domain name search query including the string selmyhousequick. Server 110 may tokenize the query as described in Step 610 above to identify the tokens "sel," "my," "house," and "quick" within the original query. The language model may calculate the probability of the tokens in this search string reflecting the user's intent.

Server 110 may also generate a potential corrected query according to the language model by identifying the complimentary token in the word pair, and replacing the original token with the corrected token, thereby generating a corrected domain name query string (Step 660). Server 110 may then calculate the probability of the tokens in the corrected search string reflecting the user's intent. Using the example above, server 110 may replace the token sel with the token sell, and calculate the probability that the user's intended search string was "sellmyhousequick."

In this example, the probability of the corrected query is higher than that of the original query (Step 640). In response to this determination, server 110 may proceed with the domain name spin according to the corrected query string, and display alternative domain name candidates accordingly, as seen in FIG. 7.

In some embodiments, server 110 may estimate the probability of each word given a prior context. In these embodiments, server 110 may utilize a simple ngram language model, a more traditional linguistic computation of trying to build a model by analyzing a document and trying to capture the unigram frequency, bigram frequency, ngram frequency, etc. In these embodiments, given a sentence, server 110 may use the ngram frequency in the sentence to estimate the probability of a particular sentence. Server 110 may be provided with a plurality of documents used as training data in a particular language to identify the most frequently used tokens and the order in which they should be associated together within different ngrams. Server 110 may then apply the language model according to the probability of these ngrams.

For example, using the phrase "it is go time," server 110 may estimate the probability of the word "time" given the prior context "It is go" (e.g., P(time|It is go)). The number of parameters required grows exponentially with the number of words of prior context. An N-gram model uses only N−1 words of prior context. For example, consider a unigram (e.g., P(time)), a bigram (e.g., P(time|go)), and a trigram P(time|is go).

As noted above, and demonstrated in FIG. 7, in some embodiments, server 110 may generate two different sets of suggested domain names during the domain name spin. A first set of suggested domain names may include domain name spins based on the original query, including the misspelled token, input by the user. The second set of suggested domain names may include domain name spins based on the corrected domain name query, including the corrected token.

Server 110 may monitor and track the conversion rate of misspell based spins, possibly using the frequency field in the misspell dictionaries (specifically the phonetic spin dictionary), and suggest misspell-based spins accordingly. As a non-limiting example, server 110 may identify a high frequency of word pairs, possibly stored in the phonetic spin dictionary, including the tokens "kids" and "kidz." By contrast, server 110 may identify a relatively low frequency of word pairs in the phonetic spin dictionary including the tokens "solutions" and "solutons."

Server 110 may ultimately use the tracked conversion rate for misspell spins. Such conversion rate may help the name ranking function to put those misspell spins in the right position. Additionally, server 110 may suggest domain name bundles that include common misspells according to the tracked conversion rates. These commonly misspelled tokens in the domain name may provide brand protection for users. As non-limiting examples, a user may input the domain name search string "happykids.com." Server 110 may suggest the misspelled domain names "happykidz.com" and "hapykids.com," according to, and ranked by, the conversion and performance rate for such domain names. Similarly, if the user inputs "gocart.com," server 110 may suggest misspelled domain names "gcart.com" and "gokart.com," etc.

Figure 8:
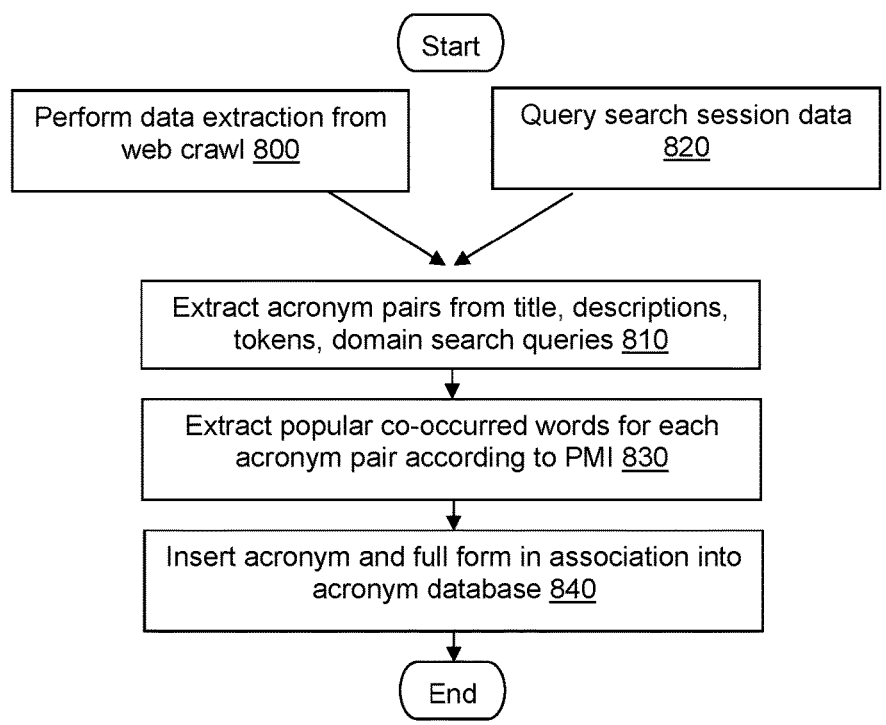
FIG. 8 is a flow diagram illustrating a possible embodiment of a method for searching a domain name with an acronym or full form of the acronym and receiving alternative domain name candidates.

FIG. 8 is a flowchart representing the method/process steps for learning acronyms in domain names from user input and/or existing web data. In one non-limiting example embodiment identifying such acronyms, server 110 may perform a web crawl (Step 800) and extract acronym pairs from domain names, and/or the title and/or descriptions associated with web pages resolving from each domain name (Step 810). Alternatively, server 110 may query database 130 to receive the domain name search data records 200 described above (Step 820) and extract acronym spins from consecutive queries within the domain name search data records 200 (Step 820).

Server 110 may also extract, from the web crawl or the domain name search data records 200, popular co-occurred words for each acronym pair (Step 830). In some embodiments, this may be accomplished by calculating Pointwise Mutual Information (PMI) of any co-occurred words. These co-occurred words may be used for acronym disambiguation, described below. For example, the acronym VR may be ambiguous, as VR could stand for virtual reality or voice recognition. Words that co-occur with the acronym may clarify the intended meaning of the acronym. For example, if the acronym VR co-occurs with the terms eyewear, movie, 360 degrees, headset, etc., it is likely associated with virtual reality. By contrast, if the acronym VR co-occurs with the terms audio, voice, speech, etc., it is likely associated with voice recognition. Once disambiguation has been determined for the acronym, server 110 may insert the acronym, along with its full form, into an acronym database (Step 840).

Turning now to step 800 in FIG. 8, server 110 may identify acronym pairs (e.g., the acronym and the full form of the acronym) from a web crawl. Server 110 may tokenize a search string and identify any acronym not found in the acronym database, possibly by identifying any token not found in any of the databases, and access any zone file accessible to server 110. Server 110 may then crawl the zone file to identify all domain names within the zone file containing the acronym candidate by tokenizing each domain name containing the acronym candidate.

Using the VR example acronym above, server 110 may receive a domain name search string, and tokenize the search string. Server 110 may identify one of the tokens as "vr." Server 110 may then access zone files for all accessible domain name registries (a .com registry, in this example) and identify two example domain names roadtovr.com and thevrcinema.com containing the token "vr." Server 110 may then tokenize these domain names to identify the tokens "road," "to," "vr," and ".com," and "the," "vr," "cinema," and ".com" respectively.

Server 110 may then perform a web crawl on each web page of each website for each of the identified domain names containing the acronym. In this example, server 110 may crawl the websites resolving from the domain names roadtovr.com and thevrcinema.com, respectively. As each web page and/or website is accessed, server 110 may crawl the content of the web page (e.g., HTML and/or JavaScript code) to identify the title (e.g., the content within HTML <title> and </title> tags) and the description (e.g., as attributes within HTML <meta> tags) of the web page.

Server 110 therefore has access to, and may analyze, a data quadruple made up of the domain name, the tokenized domain name, the title of the crawled web page on the website resolving from the domain name, and a description of the crawled web page on the website resolving from the domain name.

Using the VR example acronym above, server 110 may perform a web crawl of the websites associated with the domain names roadtovr.com and thevrcinema.com. One or more of the pages within the website located at roadtovr.com may include a title tag <title>Road to VR—Virtual Reality News</title>. Similarly one or more web pages on the website for thevrcinema.com may include a title tag <title>The VR Cinema—Home</title> and a meta tag <meta name="description" value="World's first VIRTUAL REALITY CINEMA brings you the coolest futuristic film experiences in 360 degrees">.

Turning now to Step 810 of FIG. 8, server 110 may use the data quadruples or other data extracted from the web crawl described above to identify acronym pairs from the web crawl. To identify these acronym pairs, server 110 may analyze the acronym appearing in the domain name, and search for the potential full expansion in the title/description text.

Specifically, server 110 may search for and identify the following patterns: First, server 110 may analyze the data to determine if the full expansion is followed by the acronym itself, or vice versa. Using the roadtovr.com example above, server 110 may analyze the title text "Road to VR—Virtual Reality News" searching for a proximate token beginning with the same letter as the acronym. In this example, the token "virtual" begins with the same character, and immediately follows the acronym. Server 110 may therefore determine that VR in roadtovr.com is associated with the acronym virtual reality, and store the acronym VR in association with the full form "virtual reality" in the acronym database (Step 840), or if it already exists, increment a frequency data field associated with the acronym and full form data.

Server 110 may also analyze meta or other data to determine a similar word sequence between the tokenized domain and the title/description. Using the vrcinema.com example above, server may compare the tokens within the tokenized domain name (i.e., "vr" and "cinema") with the text in the description from the meta tag ("World's first VIRTUAL REALITY CINEMA brings you the coolest futuristic film experiences in 360 degrees"). Server 110 may identify the token "cinema" as an anchor. Server 110 may then search the title/description of the website for tokens representing the full form of the acronym. Server 110 may then search the title and/or domain name description for one or more tokens beginning with the letter v matching the token "vr" in the tokenized domain name. In this example, server 110 may identify the phrase "VIRTUAL REALITY" in the description in the meta tag as matching the token "vr" in the tokenized domain name, and determine that it meets the requirements of the similar word sequence. Server may then store the acronym VR in association with the full form "virtual reality" in the acronym database (Step 840), or if it already exists, increment a frequency data field associated with the acronym and full form data.

Returning now to Steps 810 and 820 of FIG. 8, server 110 may identify domain name search records 200 including acronym spins from consecutive or associated queries. Server 110 may identify acronym pairs from search logs 200 by using the same methodology that identifies interchangeable terms or concepts 205 from consecutive queries.

For such acronym extraction (Step 810), server 110 may identify the following acronym patterns in order: 1) Acronym contains all initial letters of the full form; 2) Acronym contains some initial letters of the full form; 3) Acronym contains all initial letters as well as some of the non-initial letters of the full form; and 4) Acronym contains some initial letters as well as some non-initial letters of the full form. Server 110 may utilize the previous or subsequent queries and their tokens for PMI calculation in order to identify those highly associative words for the acronym.

In addition to the extracted acronyms, server 110 may also identify those words that co-occur with the acronym and/or full form. As noted in the examples above, the acronym VR may be ambiguous, as VR could stand for virtual reality or voice recognition. Server 110 may utilize words that co-occur with the acronym to clarify the intended meaning of the acronym. For example, if the acronym VR co-occurs with the terms movie, glass, 360 degrees, headset, eyewear, etc., it is likely associated with virtual reality. By contrast, if the acronym VR co-occurs with the terms audio, voice, speech, etc., it is likely associated with voice recognition.

Returning now to Step 830 in FIG. 8, server may use PMI as a measure to estimate the association powers between any two words. For example, server 110 may calculate the PMI for any co-occurred word, w, with respect to an acronym a, wherein $PMI(w, a) = \log(P(w, a)/P(w) P(a))$, where $P(w)$ is the probability of word w appearing in the data, $P(a)$ is the probability of acronym a appearing in the data, and $P(w, a)$ is the joint probability of both word and acronym appearing in the data.

Figure 9:
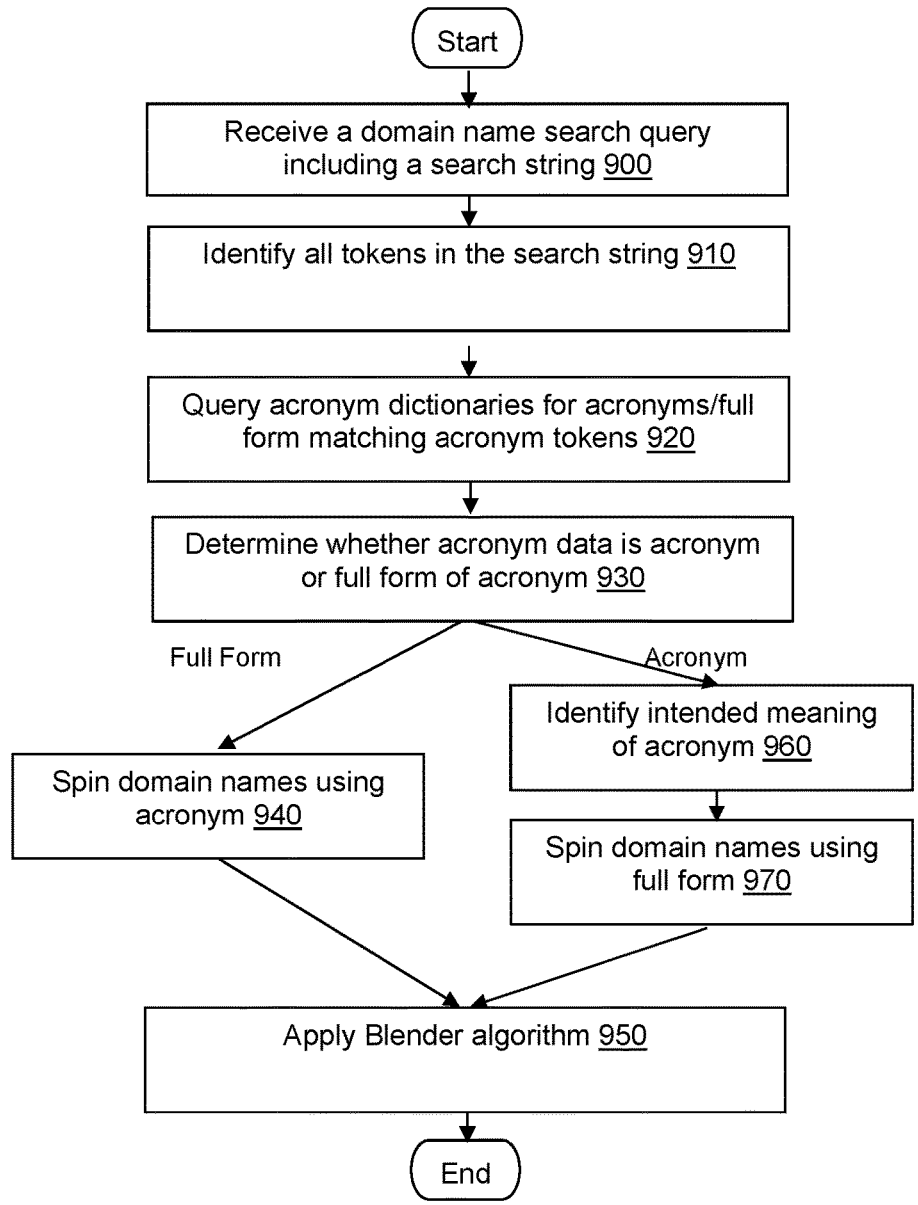
FIG. 9 is an example user interface for searching a domain name with an acronym or full form of the acronym and receiving alternative domain name candidates.
Figure 10:
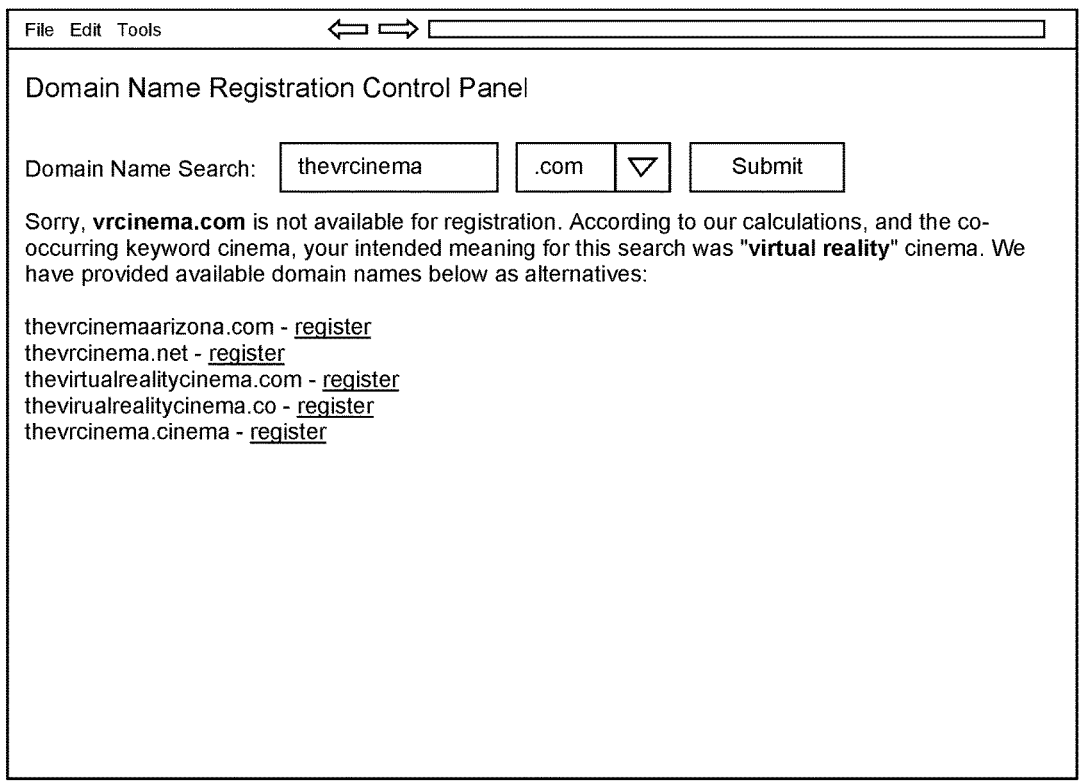
FIG. 10 is a flow diagram illustrating a possible embodiment of a method for identifying alternative domain names in a unigram-based domain name search.

FIG. 9 is a flowchart representing the method/process steps performed by server 110 in spinning domain names containing acronyms, and FIG. 10 is a non-limiting example of a UI displayed to the user after completing the method steps in FIG. 9. Server 110 may receive a domain name search request/query, including a search string, from the user via a UI on client 120 as seen in FIGS. 3, 7, and 10 (Step 900). Server 110 may then tokenize the search string to identify all tokens in the search string (Step 910). Server 110 may then query an acronym database and compare the acronyms in the acronym database with the tokens in the domain name search string to determine and/or detect the presence of acronyms or the full forms of the acronyms (Step 920). Server 110 may then determine whether the detected acronym is the acronym itself or the full form of the acronym (Step 930). If the domain name search string includes the full form of the acronym, server 110 may suggest acronym-based spins (Step 940) and apply a blender algorithm (Step 950). If the domain name search string includes the acronym itself, server 110 may perform acronym disambiguation to identify the intended meaning of the acronym (Step 960), as disclosed above, and suggest spins based on the full form of the acronym (Step 970) and apply the blender algorithm (Step 950).

Turning to Step 960 of FIG. 9, acronym disambiguation may comprise server 110 comparing the tokens in preceding queries against the co-occurred words of competing acronyms in order to decide which acronym definition was referred to or intended by the user.

Server 110 may use the blender algorithm, in Step 950 of FIG. 9, to generate spins based on an acronym as well as its full form, once server 110 has identified the acronym/full form within the query. The blender may blend both inventories and rank them accordingly. Because users generally prefer shorter names, the blender may rank acronym-based spins in a higher position, as seen in FIG. 10.

Figure 11:
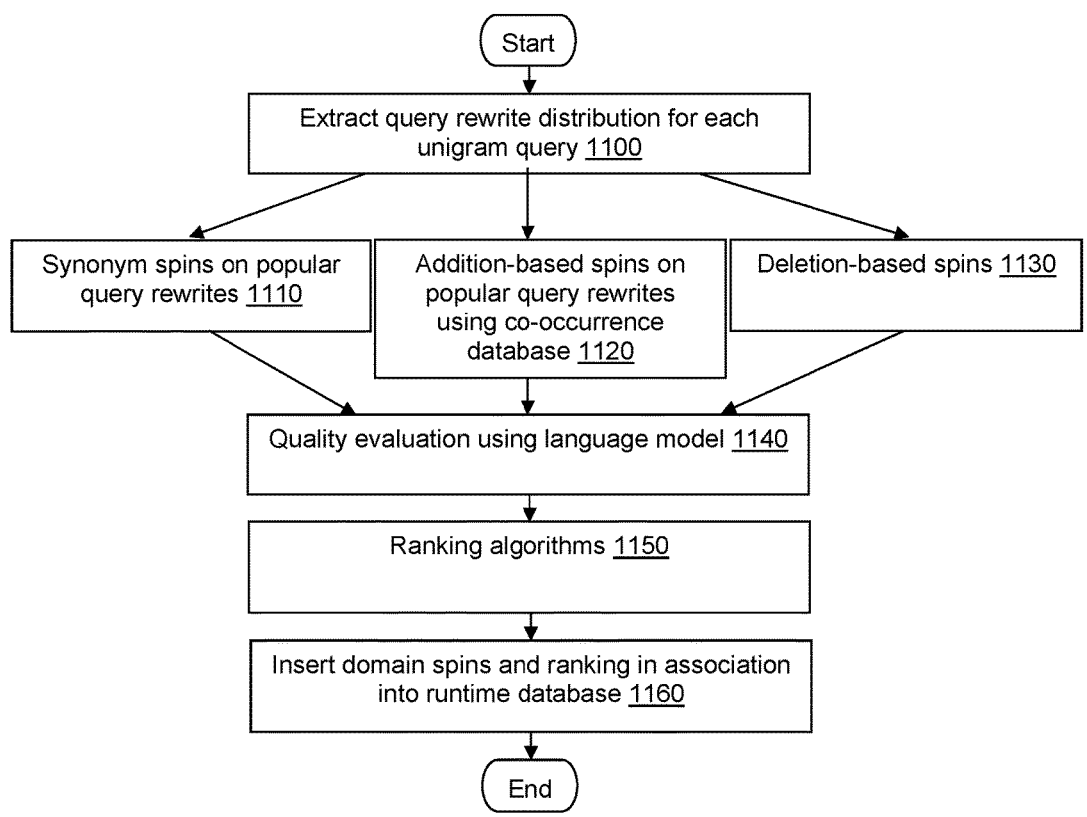
FIG. 11 is a flow diagram illustrating a possible embodiment of a method for searching a domain name containing a unigram and receiving alternative domain name candidates.

FIG. 11 is a flowchart representing the method/process steps for generating offline domain names for unigram queries. Server 110 may query the data records database of domain name search logs 200. From each domain name search query in the domain name search logs 200, server 110 may extract a query rewrite distribution for each unigram query (Step 1100). According to the query rewrite distribution for each unigram query, server 110 may then generate domain name spins including: 1) Synonym spins on popular query rewrites (Step 1110); 2) Addition-based spins on popular query rewrites using a co-occurrence dictionary (Step 1120); and/or 3) deletion-based spins (Step 1130). Server 110 may then perform a quality evaluation using the language model disclosed above (Step 1140), and rank the name spins generated (Step 1150), possibly using the ranking algorithms disclosed above. Server 110 may then store all relevant information for the ranked domain name spins to a runtime database, which will be called during runtime, ranked, and blended with the results of runtime-based domain name searches, possibly using the ranking and blending algorithms disclosed above.

Turning now to step 1100 of FIG. 11, server 110 may extract a query rewrite distribution for each unigram query. For any given unigram query, server 110 may determine its common rewrite patterns. For many .com domain names, especially for the most common words and names, unigram domain names are no longer available for registration. As a result, many domain name search data 200 may reflect that registrants have searched for unigram domain names using common TLDs, and rewritten domain name queries that were originally unigram queries into bigram or other ngram queries. Thus, as server 110 searches the zone files for domain names containing these unigram or other ngrams it may determine that many of these domain names are no longer available.

In response, server 110 may select all associated data records from the domain name search data 200, tokenize each of the domain names, identify the ngram rewrites for unigram domain names and the interchangeable tokens resulting from these rewrites, determine the frequency of ngram rewrites and/or interchangeable tokens, and sort them by frequency.

As a non-limiting example, a user may have searched for an available domain name with a search string of "pizza." On finding domain names with the unigram "pizza" unavailable, various users may have added additional ngrams to find available domain names. For example, user's may have searched using the search strings pizzarestaurant, pizzadelivery, italianpizza, and pizzarecipe.

Server 110 may query the domain name search data 200 for all domain name searches including the string "pizza," and tokenize each of these domain names. Server 110 may then generate a distribution from the frequency of each of these domain names. For example, the tokens "pizza" and "restaurant" may make up 20% of the searched domain names, the tokens "pizza" and "delivery" may make up 10%, "Italian" and "pizza" may make up 6%, and "pizza" and "recipe," 5%. Server 110 may therefore generate domain spins according to this distribution.

Returning now to step 1110 of FIG. 11, server 110 may generate synonym spins based on popular query rewrites. Server 110 may use the unigram query rewrites in the domain name search data 200 as the proxy and spin on those proxy domain names.

Turning now to steps 1120 and 1130 in FIG. 11, server 110 may spin domain names using traditional means such as synonym replacement, token dropping, or term addition using co-occurrence data determined from domain name search data, as disclosed herein.

For synonym replacement, server 110 may query and receive query results from two different synonym data sources. The first synonym data source may include data extracted from domain name search data 200, as disclosed above. The second synonym data source may include data extracted from the neural network algorithm disclosed above (e.g., Word2Vec). Server 110 may query both data sources for synonym-based domain name spins.

The neural network algorithm may provide a much longer list of synonyms compared to a search session data 200 mining approach. Server 110 may therefore create massive list of synonym spins using this algorithm.

Turning now to step 1140 of FIG. 11, server 110 may perform a quality evaluation using the language model disclosed herein. For synonym based domain name spins, server 110 may use the language model disclosed above to ensure that the spins are of good quality.

Turning now to step 1150 of FIG. 11, server 110 may rank the resulting domain name spins. The server's 110 ranking algorithms may sort those spins according to several features such as query/term overlap, name length, price, term/TLD popularity, and type of spins. This ranking may further include machine-learned ranking.

Turning now to step 1160 of FIG. 11, server 110 may store the domain name spins in a runtime database. The results may be sent to a database server, and the database server may store the data as a simple key-value within a cluster store. For each unigram query, server 110 may store the query as the key and its corresponding list of suggestions/features/ranking attributes as the value.

Figure 12:
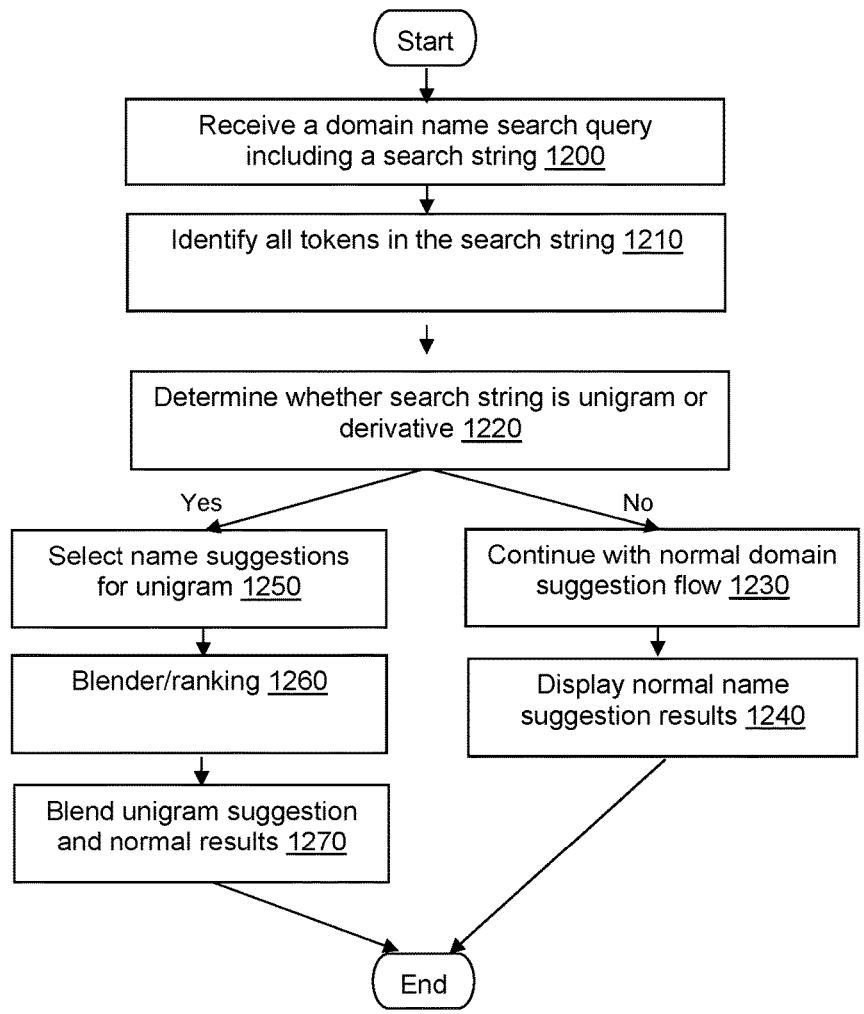
FIG. 12 is a flowchart representing the method/process steps for runtime domain name recommendation retrieval for unigram queries.
Figure 13:
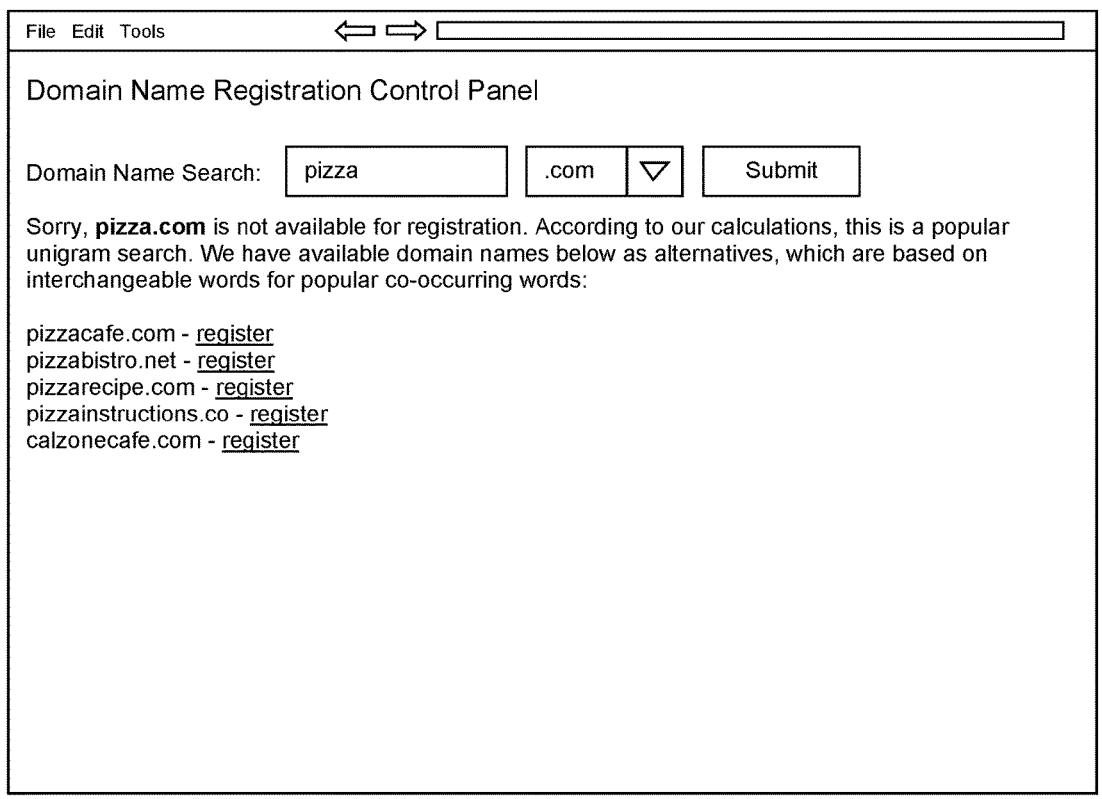
FIG. 13 is an example user interface for searching a domain name containing a unigram and receiving alternative domain name candidates.

FIG. 12 is a flowchart representing the method/process steps for runtime domain name recommendation retrieval for unigram queries, and FIG. 13 is a non-limiting example of a UI displayed to the user during or after completing the method steps of FIG. 12. Server 110 may receive a domain name search request/query, including a search string, from the user via a UI on client 120 (Step 1200). Server 110 may then tokenize the search string to identify all tokens in the search string (Step 1210). Server 110 may analyze the tokens to determine if the search query is a unigram-based query, or a derivative of a unigram-based query (Step 1220). If not, server 110 may execute and continue a normal domain name suggestion flow (Step 1230) resulting in normal domain name suggestion results (Step 1240). However, if server 110 determines that the search query is a unigram-based query (or is a derivative of a unigram-based query), server 110 may retrieve domain name suggestions for the unigram query from the runtime database including the unigram queries/suggestions stored in the runtime database in Step 1160 of FIG. 11 (Step 1250), apply the blender/ranking algorithm disclosed herein (Step 1260) and generate domain name suggestions blending unigram domain name suggestion results and typical domain name suggestion results (Step 1270).

Turning now to step 1250 of FIG. 12, server 110 may retrieve the suggestions for the unigram query from the database 130 at runtime. Upon receiving a unigram query, a software engine for identifying the unigram queries in the database 130, running on sever 110, may query the runtime database and retrieve the suggestions and their corresponding features (i.e., each of the unigram queries as the key and the corresponding list as the value.

Returning to steps 1260 and 1270 of FIG. 12, server 110 may execute a blender/ranking algorithm. The suggestion features may be used by the runtime blender algorithm as ranking features. Server 110 may calculate these features offline as well for efficiency reasons. The suggestion features may include spin types (e.g. replacement, additions, deletions), confidence scores, language model score, name length, relevancy score with respect to the unigram query, and more. The blender model may blend the offline unigram query suggestions in the runtime database with other inventory and rank all results.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention. As examples, while the invention has been described in detail for spinning domain names, the invention may also be used to spin name identifiers in other fields. As specific non-limiting examples, the invention may also be used to spin name identifiers for license plates, phone numbers and social media name identifiers.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising a server, comprising a custom-designed special purpose computing device coupled to a network and including at least one processor executing instructions comprising a specific device logic within a memory which, when executed, cause the system to:
    aggregate a plurality of search sessions including a search session for a domain name determined by the server to be unavailable, the search session being identified by a unique search session identifier and comprising a plurality of consecutive queries by a user during the search session;

identify, within the search session, a longest common string between each of the plurality of consecutive queries;

identify an interchangeable character string for the longest common string by:
  searching the plurality of search sessions for a co-occurrence of at least one additional character string with the longest common string; and
  identifying at least one synonym of the at least one additional character string;

generate, for each of the plurality of consecutive queries in the search session subsequent to an initial domain name search query, a unique data record within a unigram query suggestion database comprising:
  the unique search session identifier;
  the longest common string;
  the interchangeable character string comprising the longest common string concatenated to the at least one additional character string or the at least one synonym;
  a frequency of use that the interchangeable character string and the longest common string exist within the plurality of search sessions; and
  a modification type describing the relationship between the interchangeable character string and the longest common string as the at least one additional character string or the at least one synonym;

identify, within a search string, a token comprising a unigram;

execute a query selecting, from the unigram query suggestion database, at least one alternative available domain name candidate including:
  the unigram matching the longest common string; and
  at least one token prepended or appended to the unigram, the at least one token comprising an interchangeable token matching the interchangeable character string substituted for a co-occurring token that has previously co-occurred with the token comprising the unigram.

2. The system of claim 1, wherein the instructions cause the server, responsive to the token within the search string not being a unigram, to generate a plurality of alternative available domain name candidates according to an n-gram analysis.

3. The system of claim 2, wherein the instructions cause the server to combine the at least one alternative available domain name candidate with the plurality of alternative available domain name candidates.

4. The system of claim 3, wherein the instructions cause the server to rank the at least one alternative available domain name candidate and the plurality of alternative available domain name candidates.

5. The system of claim 1, wherein the instructions cause the server to:
  crawl at least one electronic document comprising a plurality of word pairs comprising interchangeable terms;
  identify a rewrite distribution for a plurality of unigram queries within the electronic document;
  generate a plurality of alternative available domain name candidates using at least one domain name spin technique;
  store in association in the unigram query suggestion database:
    the unigram;
    the at least one alternative available domain name candidate;
    at least one feature of the at least one alternative available domain name candidate; and
    a ranking of each of the at least one alternative available domain name candidate.

6. The system of claim 5, wherein the at least one electronic document comprises a plurality of content input during a domain name search session.

7. The system of claim 5, wherein the at least one domain name spin technique comprises a domain name spin according to a high frequency of rewritten domain name searches including the unigram.

8. The system of claim 5, wherein the at least one domain name spin technique comprises a domain name spin according to a high frequency of the co-occurring token.

9. The system of claim 5, wherein the unigram, the at least one alternative available domain name candidate, the at least one feature, and the at least one ranking are stored offline.

10. A method comprising:
  aggregating, by a server comprising a custom-designed special purpose computing device coupled to a network and including at least one processor executing instructions comprising a specific device logic within a memory, a plurality of search sessions including a search session for a domain name determined by the server to be unavailable, the search session being identified by a unique search session identifier and comprising a plurality of consecutive queries by a user during the search session;
  identifying, by the server, within the search session, a longest common string between each of the plurality of consecutive queries;
  identifying, by the server, an interchangeable character string for the longest common string by:
    searching the plurality of search sessions for a co-occurrence of at least one additional character string with the longest common string; and
    identifying at least one synonym of the at least one additional character string;
  generating, by the server, for each of the plurality of consecutive queries in the search session subsequent to an initial domain name search query, a unique data record within a unigram query suggestion database comprising:
    the unique search session identifier;
    the longest common string;
    the interchangeable character string comprising the longest common string concatenated to the at least one additional character string or the at least one synonym;
    a frequency of use that the interchangeable character string and the longest common string exist within the plurality of search sessions; and
    a modification type describing the relationship between the interchangeable character string and the longest common string as the at least one additional character string or the at least one synonym;
  identifying, by the server, within a search string, a token comprising a unigram;
  executing, by the server, a query selecting, from the unigram query suggestion database, at least one alternative available domain name candidate including:
    the unigram matching the longest common string; and
    at least one token prepended or appended to the unigram, the at least one token comprising an interchangeable token matching the interchangeable character string substituted for a co-occurring token that has previously co-occurred with the token comprising the unigram.

11. The method of claim 10, further comprising the step of responsive to the token within the search string not being a unigram, generating, by the server, a plurality of alternative available domain name candidates according to an n-gram analysis.

12. The method of claim 11, further comprising the step of combining, by the server, the at least one alternative available domain name candidate with the plurality of alternative available domain name candidates.

13. The method of claim 12, further comprising the step of ranking, by the server computer, the at least one alternative available domain name candidate and the plurality of alternative available domain name candidates.

14. The method of claim 10, further comprising the steps of:
   crawling, by the server, at least one electronic document comprising a plurality of word pairs comprising interchangeable terms;
   identifying, by the server, a rewrite distribution for a plurality of unigram queries within the electronic document;
   generating, by the server, a plurality of alternative available domain name candidates using at least one domain name spin technique;
   storing, by the server, in association in the unigram query suggestion database:
      the unigram;
      the at least one alternative available domain name candidate;
      at least one feature of the at least one alternative available domain name candidate; and
      a ranking of each of the at least one alternative available domain name candidate.

15. The method of claim 14, wherein the at least one electronic document comprises a plurality of content input during a domain name search session.

16. The method of claim 14, wherein the at least one domain name spin technique comprises a domain name spin according to a high frequency of rewritten domain name searches including the unigram.

17. The method of claim 14, wherein the at least one domain name spin technique comprises a domain name spin according to a high frequency of the co-occurring token.

18. The method of claim 14, wherein the unigram, the at least one alternative available domain name candidate, the at least one feature, and the at least one ranking are stored offline.

* * * * *